United States Patent [19]
Crawford

[11] 3,892,201
[45] July 1, 1975

[54] BROODING AND REARING OF POULTRY

[75] Inventor: Lloyd B. Crawford, Wynyard, Canada

[73] Assignee: Crawfords Foods Ltd., Saskatchewan, Canada

[22] Filed: Nov. 30, 1973

[21] Appl. No.: 420,466

[30] Foreign Application Priority Data
Dec. 18, 1972  Canada .................................. 159320

[52] U.S. Cl. ..................................... 119/17; 119/21
[51] Int. Cl.[2] ........................................... A01K 31/06
[58] Field of Search ............. 119/17, 18, 21, 22, 30

[56] References Cited
UNITED STATES PATENTS

| | | |
|---|---|---|
| 2,604,874 | 7/1952 | Forbes et al. .................... 119/21 X |
| 2,702,503 | 2/1955 | Wildhaber ....................... 119/30 X |
| 3,173,564 | 3/1965 | Mayo .............................. 119/12 X |
| 3,396,703 | 8/1968 | Trussell ............................. 119/30 |

*Primary Examiner*—Hugh R. Chamblee
*Attorney, Agent, or Firm*—Spencer & Kaye

[57] ABSTRACT

This relates to methods of brooding and rearing poultry, especially broiler poultry, i.e., poultry raised solely for the production of edible meat, and to apparatus for carrying out the method. The poultry is reared in cage units with solid or continuous floor surfaces with the manure or droppings being allowed to build up on these floors as a litter-free layer during the growing cycle. The droppings are maintained in a relatively dry state during the growing period to avoid problems of disease, discomfort, etc.

9 Claims, 16 Drawing Figures

BROODING AND REARING OF POULTRY

BACKGROUND OF THE INVENTION a. Field of the Invention

This invention relates to improvements in methods of brooding and rearing poultry, especially broiler poultry, i.e., poultry raised solely for the production of edible meat, and to apparatus for carrying out the method.

b. Prior Art

Practically all of the broiler poultry in North America is grown on the floors of insulated barns, with a litter of straw, shavings, peanut shells or other material to provide comfort, warmth and ease of cleaning. The birds themselves use only the bottom 12 inches of the barn, yet a full headroom of at least 8 feet is required for ease of cleaning with tractors and to allow caretakers to move about comfortably. Disadvantages of this system of rearing are:

1. High capital cost in relation to capacity;
2. High cost of heating unused area buildings;
3. Cost of procuring, spreading and later disposing of litter;
4. Cost of catching and loading out finished birds, with its related loss of quality due to bruising or otherwise damaging of birds;
5. Ever-increasing difficulty in disposing of large quantities of litter and manure combined;
6. Loss of efficiency due to competition between birds in large flocks of many thousands.
7. High labour costs.

The disadvantages of the above traditional method have been known for years. As a result, many attemps have been made in the past to raise birds in cages, i.e., multi-floor arrangements designed to overcome the waste-paper disadvantage of the prior art method. Conventional cage rearing, however, calls for the birds to be supported on a non-continuous support such as wire screening so that the droppings might pass downwardly therethrough onto dropping boards or some form of conveyor system for manure disposal. The problems encountered outweighed the advantages of the cage rearing process so that, thus far, cage rearing has not found general acceptance in the poultry raising industry. Some of these problems are:

1. Severe downgrading problems and/or damage to birds as a result of trying to raise birds on wire screening. One of the most serious problems is that of "breast blisters" (a watery sac on the chicken breast believed to be caused by undue contact with the wire support screen) which develop on an overly high percentage of the poultry raised in this fashion. Breast blisters cause the birds to be downgraded to a "utility" grade and result in severe profit loss if at all prevalent. Leg weakness, hock damage and feet sores are also problems with wire screen raised chickens.

2. Complex and expensive manure disposal systems. Some cage rearing system call for the use of moving conveyor belts which pass beneath each of the wire screen floors of the cages while other systems employ pans or droppings boards beneath each with screen floor which are removed periodically so that the manure may be scraped therefrom. Manure disposal is often a problem.

3. Some cage rearing systems call for the birds to be transferred from one cage system to another during their growing period with resultant extra handling costs and lower yield due to disturbance of the birds.

SUMMARY OF THE INVENTION

The present invention alleviates many of the problems inherent in the prior art by providing the cage units with solid or continuous floor surfaces such that the manure or droppings produced by the birds can build up on these floors as a litter-free layer during the growing cycle. The droppings are maintained in a relatively dry state during the growing period to avoid problems of disease, discomfort, etc.

More specifically, the present invention provides, in one aspect, a method of rearing poultry in a cage unit including a floor having a substantially continuous surface comprising the steps of positioning a number of infant poultry in said cage unit such that they are supported directly on said continuous floor surface, supplying food and water to said poultry and maintaining the cage unit at a temperature adequate as to provide for growth of said poultry, permitting the poultry to remain in said cage unit for a selected growing period, the droppings produced by the growing poultry being allowed to continuously build-up on said continuous floor surface during said selected growing period substantially in the absence of litter to form a layer of substantially litter-free manure thereon with said poultry being supported directly on said layer of manure, and effecting drying of said layer of manure throughout the growing period of said poultry to maintain the average moisture level of said manure layer below a preselected level, thus to provide for the comfort and health of said poultry.

In a further feature of the invention the drying of said layer of manure is effected by passing a flow of air across and over said continuous floor surface and the layer of manure thereon. In a preferred form of the invention the rate of movement of said air is progressively increased during the growing period of the poultry to effect drying of the increasing amounts of droppings emitted by said birds.

According to a further feature of the invention said drying of the layer of manure is carried out such that the moisture level of said layer of manure is maintained below about 40 percent by weight.

In a preferred form of the invention a plurality of said floors are provided in vertically spaced relationship with the poultry being reared on each of said floors.

The invention, in a further aspect, provides apparatus for carrying out the above method.

The present invention may, in hindsight, appear simple, but it should be pointed out that although cage rearing has been known for some 40 years, no one to the best of our knowledge came up with the principle of growing the poultry in cage units directly on their own droppings while drying said droppings as described above. The development of this concept is thus not something to be considered an obvious expedient; our experience suggests that those skilled in the art considered it essential to separate the growing birds from the manure produced thereby as much as possible. The conventional floor rearing method employed sufficient litter, i.e., straw, shavings, etc. so that the actual droppings constituted only a minor proportion of the built-up layer on the floor, while in the known cage rearing units employing screen or screen-like floors, the droppings passed through the floor altogether and were thus completely separated from the birds. The concept of growing birds on a solid or continuous floor in the absence of litter, with the litter-free manure being dried and allowed to build up on the floor with the birds being supported directly on such layer in accordance with the present invention thus may be said to represent a substantial if not a radical departure from what has been done in the past.

The layer of litter-free manure, surprisingly, acts as a cushion and has an insulating effect provided it has been sufficiently dried, and thus it acts to keep the level of incidence of breast blisters very low; hock and foot damange is also negligible. Equipment cost is lower than with prior art cage units since there is no need to supply dropping boards, pans, or conveyor belts, and the cages are somewhat more compact since each floor level does not require the above devices. Labour costs is lower since the cages need only be cleaned after the birds have been removed for slaughter; further, the birds are not disturbed by any cleaning procedure during the growth period so yield and efficiency may be kept at high levels. Yield, mortality rate, and overall efficiency are comparable with the results obtained with conventional floor reared poultry as will be seen hereinafter. Furthermore the litter-free manure shows great promise for use as a soil conditioner or, due to its protein content, as an additive in feeds for ruminants, e.g., cattle.

BRIEF DESCRIPTION OF THE VIEWS OF DRAWINGS

The invention will be further described by way of example with reference being had to the following drawings.

DETAILED DESCRIPTION

Figure 1:
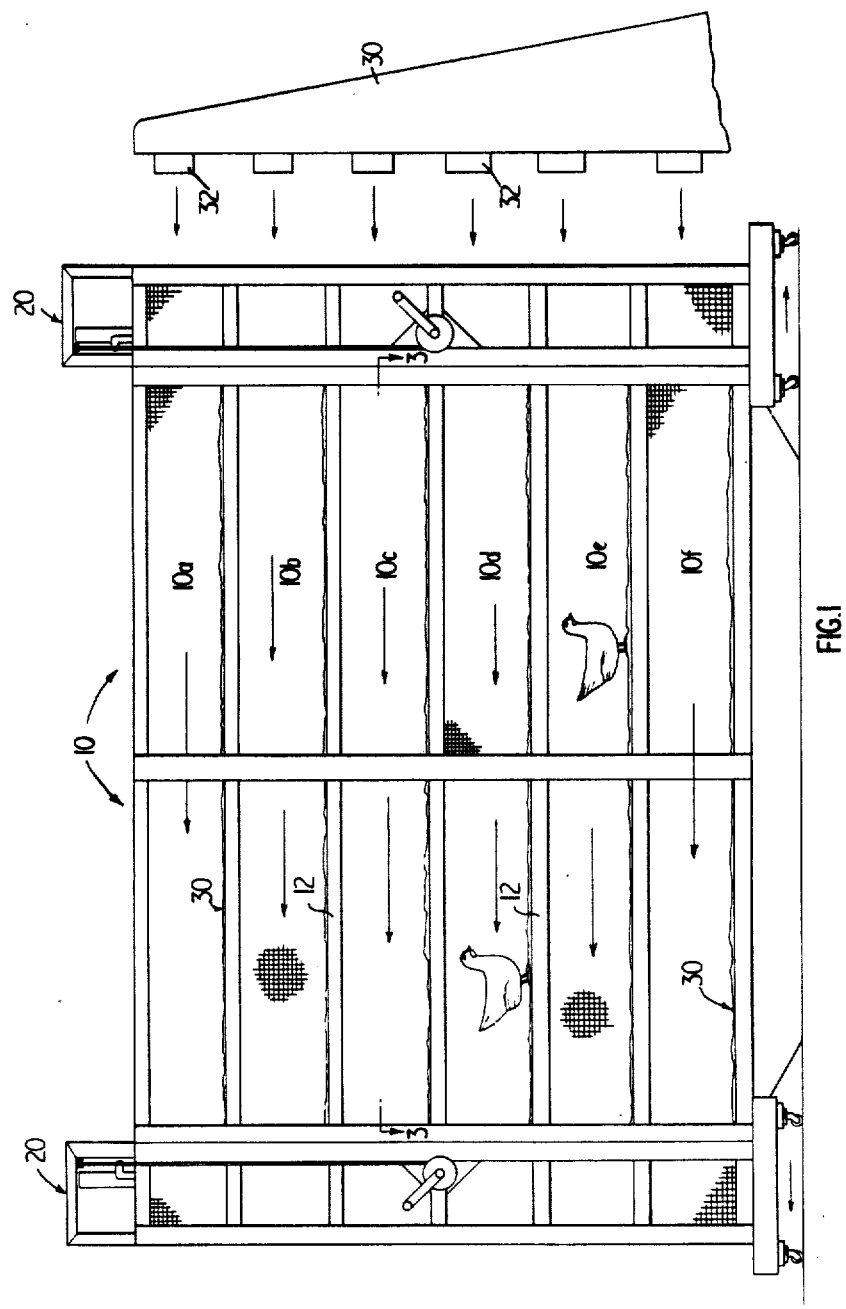
FIG. 1 is a side elevation of a multi-floor cage rearing unit capable of putting the principles of the present invention into practice.
Figure 2:
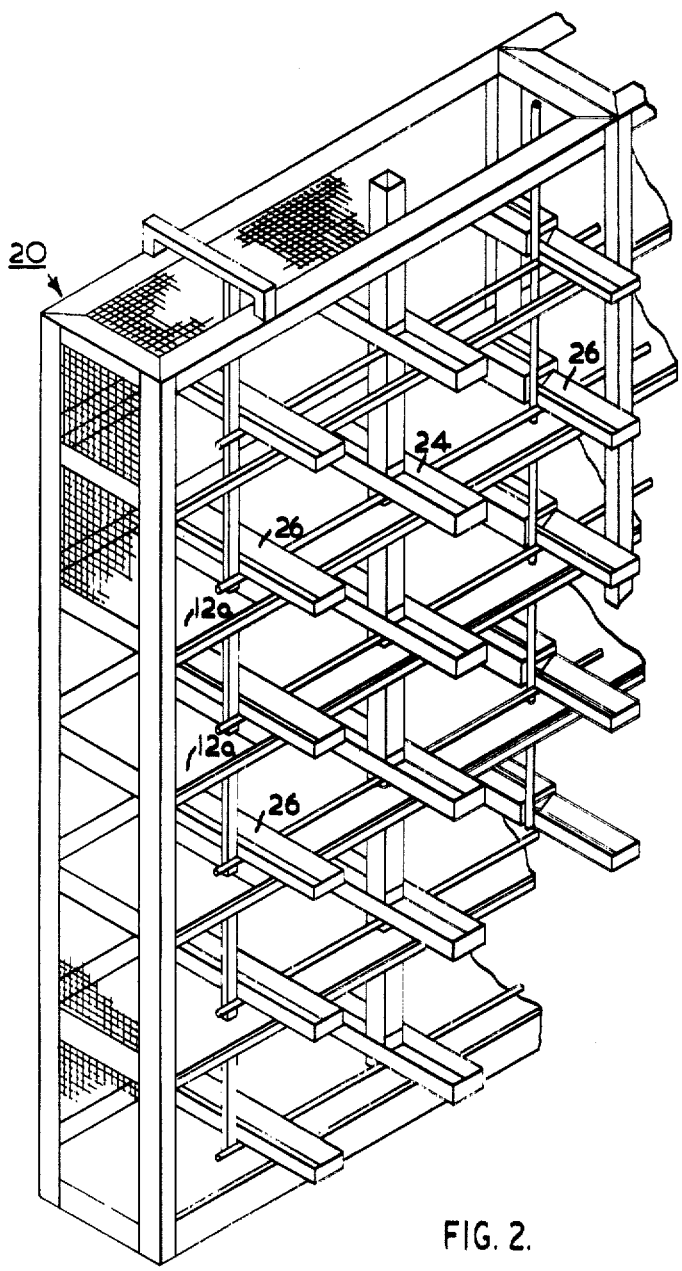
FIG. 2 is a side elevation of a multi-floor cage rearing unit capable of putting the principles of the present invention into practice.
Figure 3:
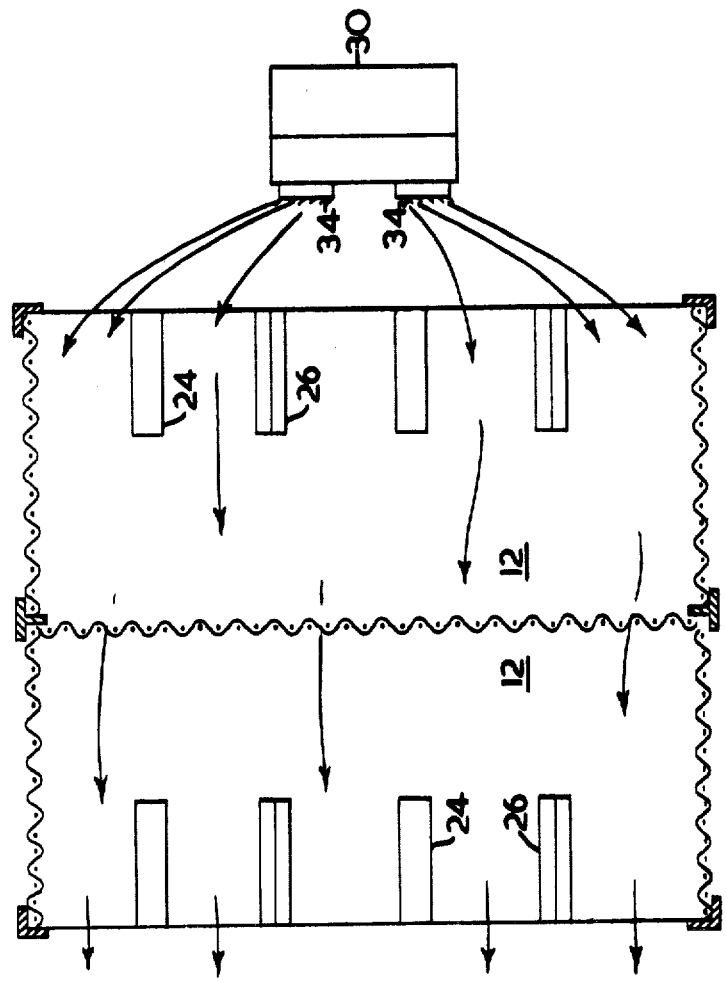
FIG. 3 is a plan view of one of the floors of the cage unit of FIG. 1 showing the air flow pattern.

A typical cage unit for rearing poultry in accordance with the invention is illustrated in FIGS. 1–3. The cage unit 10 shown is of welded steel construction and includes six growing levels or tiers 10a through 10f. The cage includes a suitable welded frame to provide structural stability, and each growing level includes a floor 12 defining a continuous support surface. Galvanized sheet steel or iron is preferred but, of course, other materials such as plywood could be used as well. The outside walls 16 are typically of wire mesh in a rectangular 1 X 1 inch pattern as is a medial partition 18 which effectively divides each floor area into two sections thus assisting in avoiding problems of overcrowding, undue competition among birds, etc. The wire mesh walls prevent escape of young chickens through it while at the same time resistance to air flow through each tier is minimal. The dimensions of a typical unit may vary but good results have been obtained with cages 8 ft. long X 8 ft. wide with six growing levels each about 13 inches high. The feeding and watering arrangements used may vary so long as food and water is readily available to the growing birds at all times. One very suitable feeding and watering arrangement is shown in FIGS. 1 and 2 and designated by the reference numeral 20. As seen in FIG. 1, these feeding and watering devices 20 are disposed on each of the opposing sides of the cage 10. Each of these devices 20 may be mounted on rollers 20 to permit them to be moved away from the sides of the cage to enable workmen to clean the feeding and watering systems in the event that plugging occurs. This concept is also useful when it comes time to transport the grown birds to market or to a milling station since the entire feed and water system can be displaced outwardly of the cage and the latter then moved onto the bed of a transport truck.

The feed and water arrangements 20 each include a framework outfitted with small floor portions 12a which match up with and form continuations or extensions of the floors 12 of the cage 10 so that when feed and water devices 20 are in position, they form, in effect, a part of the cage and the birds can enter the respective floor areas 12a and thus easily gain access to the feed troughs 24 and the water troughs 26 which project into the cage at several locations in each tier of the cage. The feed and water troughs 24, 26 are supplied from central supply systems which we need not describe here and provision is made to raise the feed and water troughs gradually as the birds grow to provide for continual ease of access thereto during the growing period.

The outer walls of the feed and water arrangements 20 are made of wire mesh or screen the same as described previously to provide ease of air flow therethrough as well as preventing escape of baby chicks therefrom.

The invention provides for the birds to be supported on the continuous floors of the several levels 10a – 10f throughout their growing period with their droppings building up as a layer on these floors. No litter is added to this layer of manure but, rather, the manure is continually dried throughout the growing period to ensure the health and comfort of the birds. In the preferred form of the invention this is accomplished by directing streams of air across and through each growing level or tier 10a–10f to effect the necessary drying while at the same time providing good ventilation and the necessary temperature conditions for the growing birds. FIG. 1 shows a plenum chamber 30 supplied with air under the correct temperature, pressure, etc., chamber 30 being equipped with air outlets 32 for each level or tier 10a–10f. Outlets 32 are provided with suitable deflectors 34 which assist in spreading the air flow evenly over the floor surface to dry the layer of manure which gradually builds up thereon over the entire growing period which, for broilers, is typically about 8 weeks. The average velocity of the air flow varies according to the birds age. For very young chickens, the air flow should be quite low, say about 2 to 5 feet/min. but, in order to provide drying of the increasing amounts of manure created by the growing birds, the air flow must be progressively increased throughout the entire growing season to a level preferably in the order of 100–150 ft./minute by the time the birds are 8 weeks old.

The temperature of the air is, of course, controlled at levels which vary depending on the age of the birds. The following temperature levels are generally considered to be acceptable to those skilled in the art.

TABLE 1

| Age of Bird in Weeks | Temperature - °Farenheit |
| --- | --- |
| 0 – 1 | 93 – 95° |
| 1 – 2 | 88 – 90 |
| 2 – 3 | 83 – 85 |
| 3 – 4 | 78 – 80 |
| 4 – 5 | 75 approx. |
| 5 – 6 | 70 approx. |
| 6 – 8 | 65 approx. |

The preferred relative humidity is, generally speaking, held in the range 48 to 55 percent.

The following table gives moisture contents by weight in manure samples taken in a number of different tests:

TABLE 2

| Sample | Moisture % by Weight |
| --- | --- |
| 1 | 35.70 |
| 2 | 46.44 |
| 3 | 46.45 |
| 4 | 31.48 |
| 5 | 23.85 |
| 6 | 37.03 |

Samples 2 and 3 had an unduly high moisture content believed to be due to water spillage in the cage. Generally speaking, the moisture level in the manure should be kept below 40 percent by weight with optimum results obtained when the moisture is maintained from about 25 to about 35 percent by weight.

Figure 4:
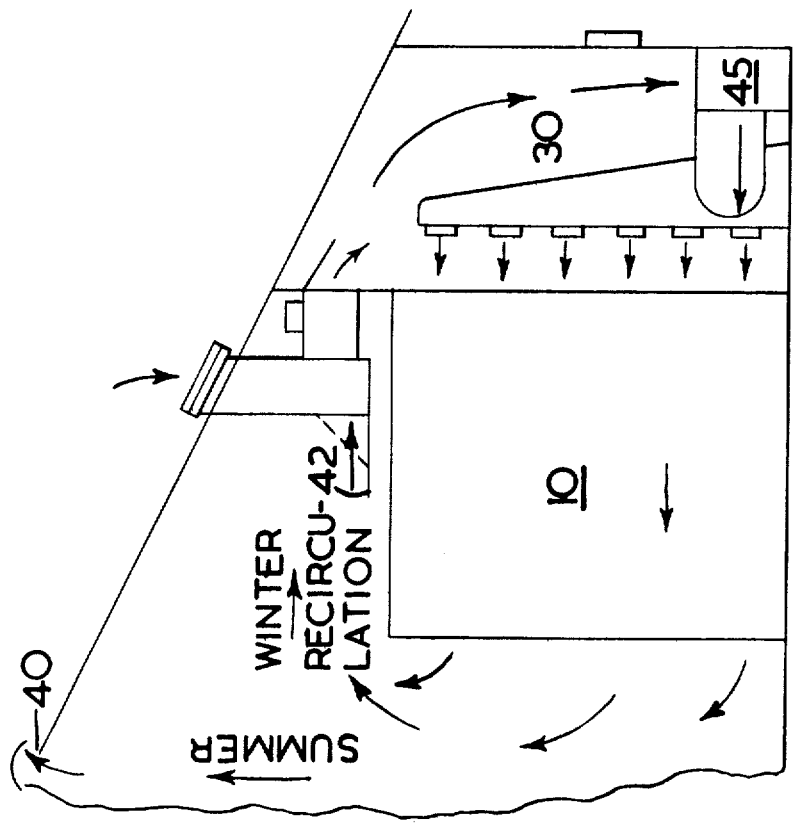
FIG. 4 is a sectional elevation view of a portion of a chicken barn illustrating the ventilation system.

One form of air circulation system is shown in FIG. 4. In summer, a major portion of the air which moves through cage 10 passes outwardly through the roof vent 40 but in the winter, in order to conserve heat, recirculation of air is provided for by a flap valve 42 near the roof which is opened to permit a recirculating fan to return warm air to the heating and air conditioning device 45, the latter supplying the above mentioned plenum chamber 30 with the required air flow.

REPORT ON EXPERIMENTS

Equipment

Two "brooder-rearers" (or battery cages) were built. Each of them was 8 feet long × 8 feet wide × 6 tiers high. Construction was of fabricated steel. Down the center of each brooder-rearer was a partition of 1 × 1 inch welded wire mesh screen. The outside walls were also of 1 × 1 inch welded wire mesh screen.

The floors of the cage were of galvanized iron. Each of the 24 compartments in the two brooder-rearers was equipped with a feed trough inside, which could be raised as the birds grew. Water troughs were attached outside the compartments. Each brooder-rearer was equipped with a centrifugal fan and plenum chamber as described previously which could distribute air over and through each tier to effect drying of the layer of manure which was allowed to build up on each floor over the growing period. Air temperature was maintained at a suitable level as described previously.

In the same building were 12 conventional floor pens. Birds were raised in these pens in the conventional way i.e., on litter covered floors. They acted as the "control" units against which the results of the experiments in the cage compartments were compared.

General

Both the cage reared birds and the floor or control birds were fed a diet which is considered standard or conventional in the broiler industry.

The report on the six experiments involved over 10,000 birds and will be dealt with under the following headings. All experiments were terminated at eight weeks with the exception of experiment 4 which was run for 9 weeks. All birds were maintained continually in their cages from the time they were a day old until termination of the experiment. The birds used in all experiments were the "Peel" strain of broiler chicken, but in one experiment both Peel and "Hubbard" varieties were used for comparitive purposes. The results were essentially the same for both species.

1. Density of Birds

Different densities viz., 0.33, 0.40, 0.50 and 0.75 square foot per bird in cages versus 0.50 and 0.75 square foot per bird on conventional littered floor were tried in the various experiments.

Eight week body weights were considerably lower for birds provided with either 0.33 or 0.40 square foot of space than those provided with either 0.50 or 0.75 square foot in cages. The difference in body weight was not significant when comparing the birds provided with either 0.50 or 0.75 square foot space in cages with each other. There was no significant difference in the weight of the birds provided with 0.75 square foot of space, irrespective of the system of rearing. On the basis of performance of birds it was found that 0.50 square foot per bird is the optimum density for raising birds in cages.

The following discussion compares birds provided with 0.5 square foot per bird in cages to the birds alloted 0.75 square foot per bird on the floor.

2. Body Weight

Figure 5:
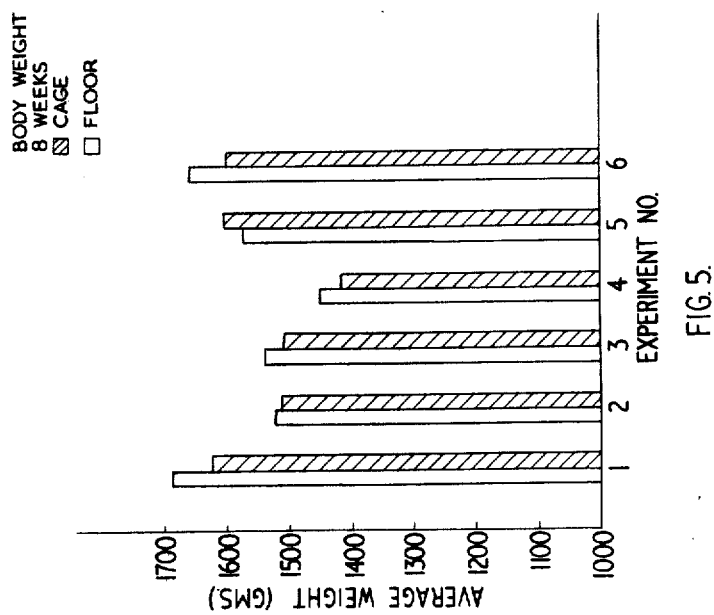

FIG. 5 shows the average weight of 8 weeks old birds raised in cages and on floor. In general, the average weight of birds reared on the floor was 1,571 g, while it was 1,543 g for those raised in cages. However, the statistical analysis showed that this difference was not significant at the 5 percent level of probability.

Figure 6:
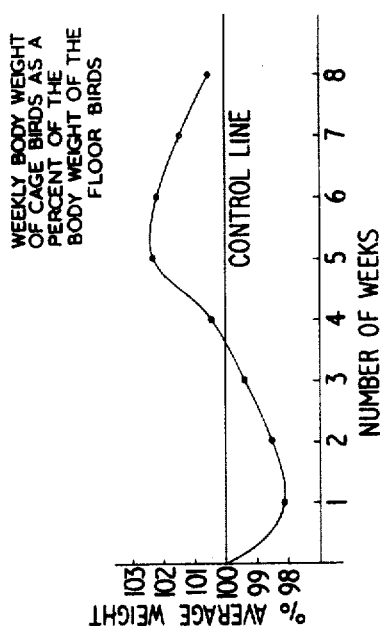
FIG. 5–16 are graphs illustrating the results of experiments carried out for the purpose of comparing the results obtained when rearing broilers in accordance with the principles of the present invention in relation to broilers reared on the floor of a chicken barn in conventional fashion.
Figure 8:
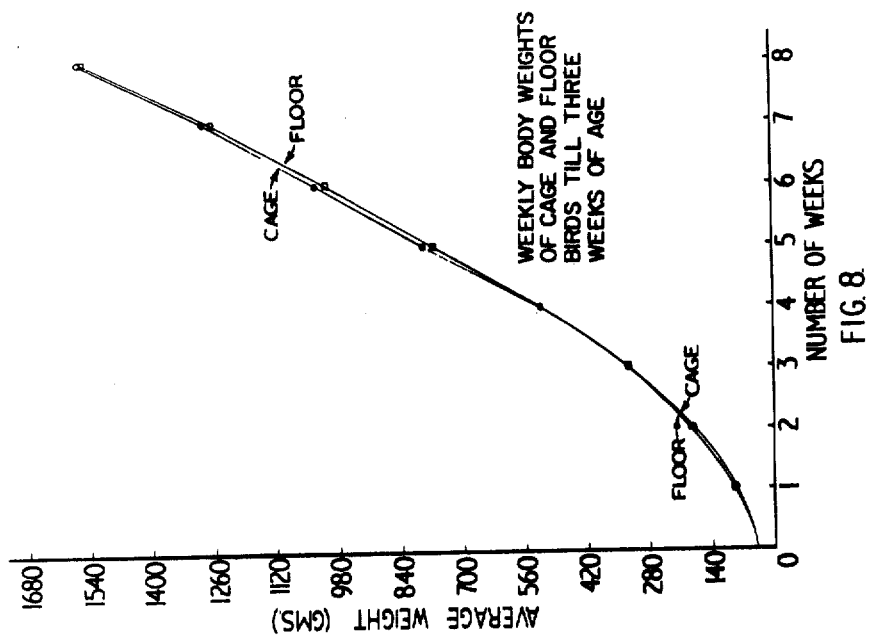
Figure 7:
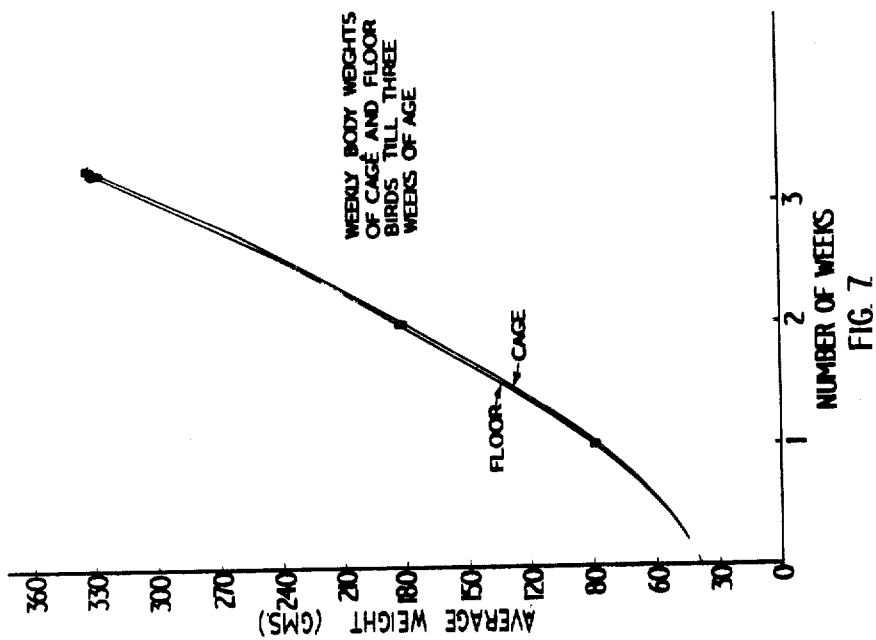

It was also observed during these experiments that the cage birds did not gain as well as the floor birds (control) during the first 3 weeks. FIGS. 6 and 7 show this effect clearly. After the expiry of 3 weeks, however, (FIG. 8) the birds are equal in body weight to the floor birds. There may be several reasons for this relatively poor growth of the cage birds in the first 3 weeks, viz., insufficient light, heat or difficulty in getting to the feed and water. All these factors are under active consideration and it is believed that the situation can be fully rectified.

3. Feed Efficiency Ratio

Figure 9:
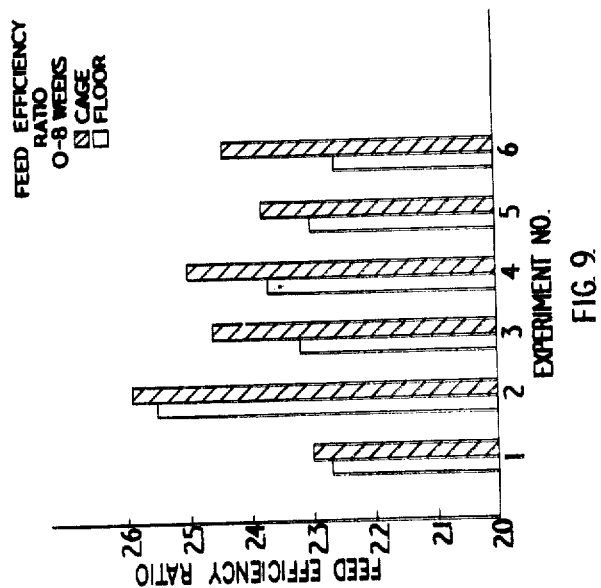

FIG. 9 shows that the cage birds had a slightly lower feed efficiency than birds on the floor. The statistical analysis revealed that difference was not found to be significant at the 5 percent level of probability. The lower feed efficiency may be due to a higher feed consumption and/or a considerable amount of feed wastage in cages.

4. Edible Meat Conversion (Pound of edible meat per lb. of feed consumed)

Figure 10:
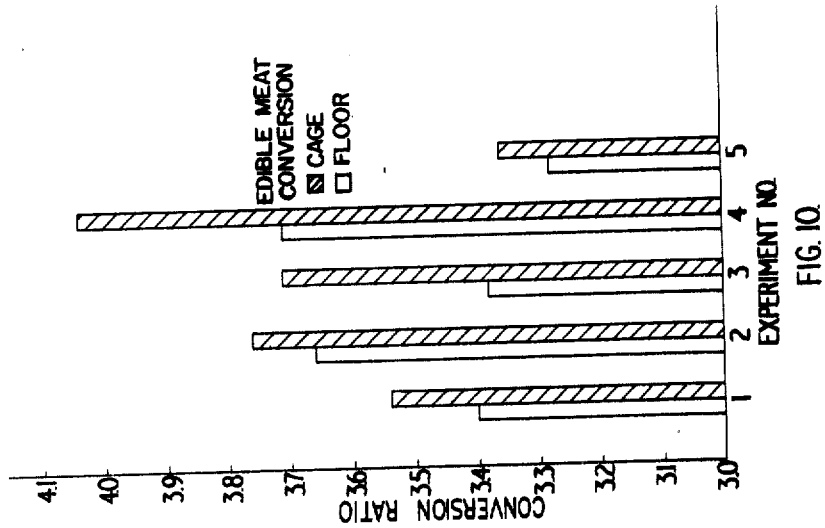

FIG. 10 shows that the edible meat conversion was slightly better for floor birds than those raised in cages. The statistical analysis showed that the differences were not significant at the 5 percent level of probability. The higher ratio in cage birds may be due to the same factors discussed in point 3.

5. Breast Blisters

The incidence of breast blisters was 4.5 percent for cage birds and 3.0 percent for floor birds when each bird had 0.5 square foot of space. The difference in incidence was found to be significant at the 5 percent level. There was no significant difference in the incidence of breast blisters between floor and cage reared birds when both are allotted 0.75 square foot per bird. The cushioning effect provided by the layer of dried manure is thus seen to be almost as effective in controlling the incidence of breast blisters as conventional litter.

6. Percent Grade A Carcasses

Figure 11:
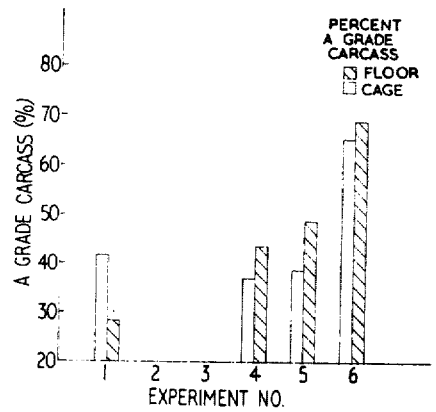

FIG. 11 shows the percent of grade A carcasses for four experiments. Birds in experiments 2 and 3 were not graded on an individual basis. In three experiments, the birds in cages showed a higher percentage of grade A carcasses over the floor birds, whereas in experiment 1, the floor birds showed a higher percent grade A carcasses than cage birds. The statistical analysis revealed that the differences were not significant at 5 percent level.

7. Mortality Rate

Figure 12:
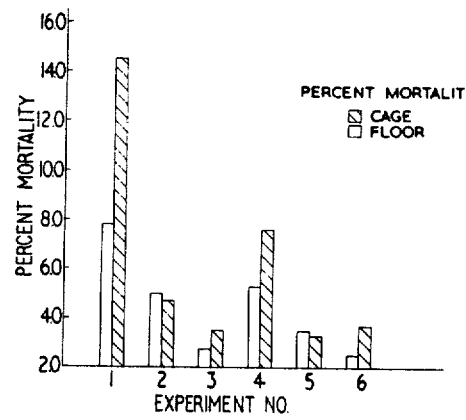

FIG. 12 summarizes the percent mortality in the six experiments. The mortality was lower in most of the experiments, except the first one. The reasons for comparitively higher mortality rate in the first experiment might be a. Some of the chicks might have been chilled during transit from hatchery.

b. Warm air circulated around cages may not have been uniform, also temperature might have been too low for the chilled chicks.

The statistical analysis of data on mortality rate in cages and on floor revealed that the difference was not significant at 5 percent level.

8. Gross Return Per Bird

Figure 13:
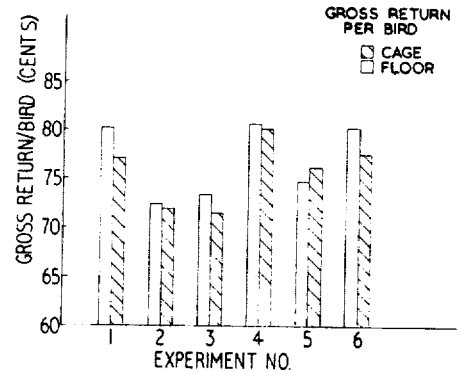

FIG. 13 shows the gross return per bird in both the cage and floor reared birds. In general it was found to be nearly the same for both systems of rearing broilers. The return per birds was 74.8 cents for cage birds, and 76.1 cents for floor birds. The statistical treatment of the data showed the difference to be nonsignificant at 5 percent level.

9. Return per Bird Less Feed Cost

Figure 14:
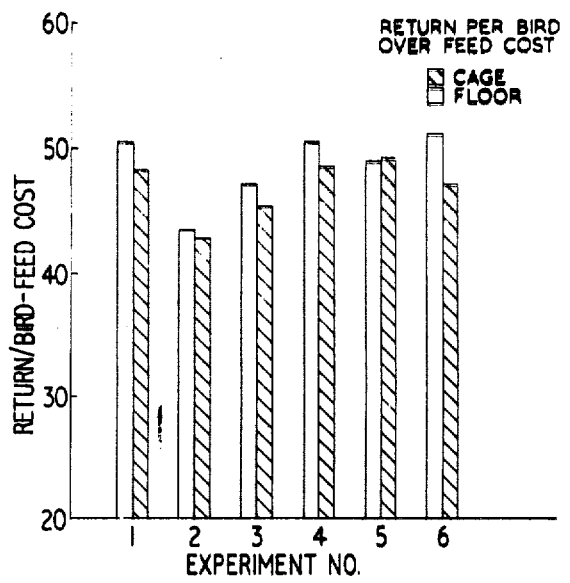

FIG. 14 shows that the return per bird less feed cost is generally lower for cage birds than those on the floor. The return per bird was 46.5 cents for birds raised in cages, while it was 48.2 cents for birds reared on floor. The statistical analysis showed these differences to be nonsignificant at 5 percent level of probability. The reason for lower return per bird in cage may be the same as discussed in point 3.

10. Gross Return Per Square Foot

Figure 15:
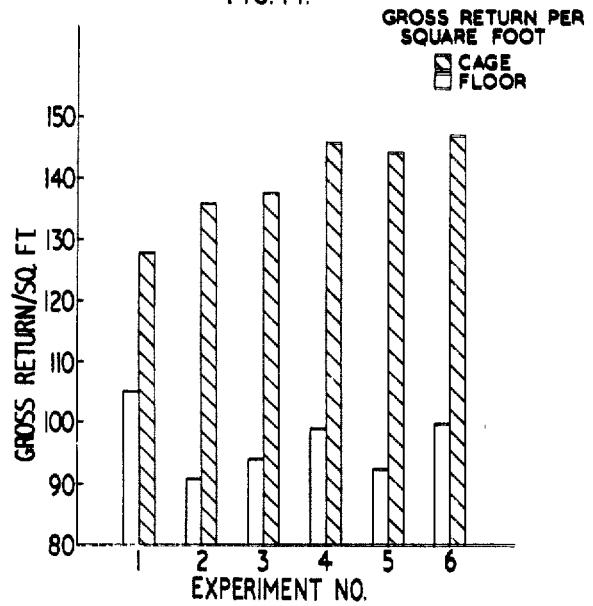

FIG. 15 shows the gross return per bird calculated on a square foot basis. It shows a dramatic increase in return per bird raised in cages than those on the floor. In general, the gross return per square foot was found to be 139.5 cents for birds raised in cages, and 96.7 cents for those reared on floor. The statistical analysis showed the difference to be significant at 5 percent level of probability. There was an advantage of 42.8 cents per square foot in raising the birds in cages rather than on floor. The gross return per square foot increased with a decrease in the amount of space provided per bird in cages.

Thus we see that this factor favours a great deal for raising birds in cages rather than on floor. The production of edible meat can be further increased for the same area by adopting greater densities in the cages.

11. Net Return Per Square Foot

Figure 16:
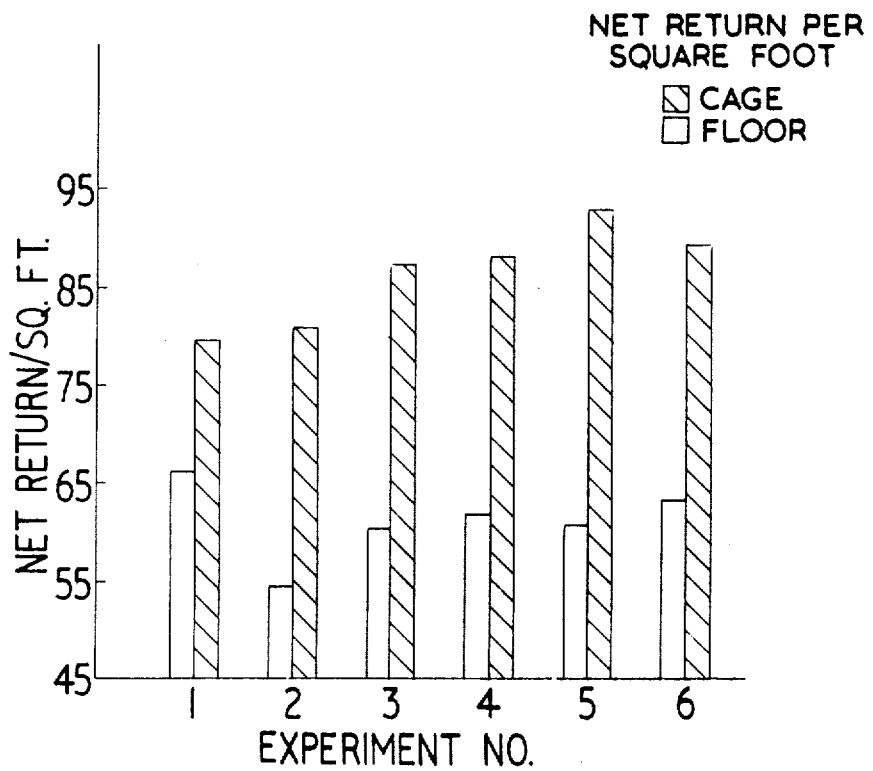

FIG. 16 shows the net return per square foot for the six experiments. The net return value was found to be 86 cents for birds reared in cage and 61 cents for birds raised on floor. The statistical treatment of these data revealed that the differences were significant at 5 percent level of probability. There was an advantage of 25 cents per square foot in raising birds in cages rather than on floor.

12. Feet and Legs

No problems were encountered in connection with the feet and legs of the cage reared birds i.e. no significant incidence of leg weakness problems or foot disease occured during the test.

CONCLUSIONS

On the basis of the results of six experiments conducted it is evident that the system of rearing broilers in cages as described may be safely adopted over the conventional floor system of raising broilers. This recommendation can be supported by the following facts:

1. Eight week body weights of cage birds were not significantly different from those raised on floor.

2. Little significant difference was found in the incidence of breast blisters in birds reared on floor than in cages.

3. Mortality rate in cage birds was not significantly different from those reared on floor.

4. Gross return per square foot was significantly higher in favour of caged birds.

5. Net return per square foot was significantly higher in favour of caged birds.

It this follows that the method of the present invention provides results comparable with the results of floor reared birds without many of the disadvantages of same as outlined previously. The problems associated with prior art cage rearing methods have also been significantly alleviated. The practice of the present invention also results in the production of a valuable by-product, i.e., the dried litter-free manure, which shows promise as a soil conditioner or as an additive in feeds for ruminants.

The invention is by no means limited to broiler chickens. For example, broiler turkeys have been successfully reared in cages following the method of the present invention. The cages must provide more head room, i.e., about 21 inches and, of course, the growing period is longer, about 14 weeks as compared with 8 weeks for broiler chicken. Otherwise, no unusual problems were encountered and the experiment was considered a success.

I claim:

1. A method of rearing poultry in a cage unit including a floor having a substantially continuous surface comprising the steps of:
   a. positioning a number of infant poultry in said cage unit such that they are supported directly on said continuous floor surface;
   b. supplying food and water to said poultry and maintaining the cage unit as a temperature adequate as to provide for growth of said poultry;
   c. permitting the poultry to remain in said cage unit for a selected growing period;
   d. the droppings produced by the growing poultry being allowed to continuously build-up on said continuous floor surface during said selected growing period substantially in the absence of litter to form a layer of substantially litter-free manure thereon with said poultry being supported directly on said layer of manure;
   e. and effecting drying of said layer of manure throughout the growing period of said poultry to maintain the average moisture level of said manure layer below a preselected level thus to provide for the comfort and health of said poultry.

2. The method according to claim 1 wherein the drying of said layer of manure is effected by passing a flow of air across and over said continuous floor surface and the layer of manure thereon.

3. The method of claim 2 wherein the rate of movement of said air is progressively increased during the growing period of the poultry to effect drying of the increasing amounts of droppings emitted by said birds.

4. The method of claim 1 wherein said drying of the layer of manure is carried out such that the moisture level of said layer of manure is maintained below about 40 percent by weight.

5. The method of claim 1 wherein said poultry is kept in said cage unit continuously until reaching marketable size, the droppings being allowed to build up on said floor surface over the entire growing period of the poultry.

6. The method of claim 1 wherein a plurality of said floors are provided in vertically spaced relationship with the poultry being reared on each of said floors.

7. The method of claim 1 wherein said poultry comprises broiler chickens.

8. The method according to claim 1 wherein said drying of the layer of manure is carried out such that the moisture level of said layer of manure is maintained below about 40 percent by weight, and said poultry is kept in said cage unit continuously until reaching marketable size, the droppings being allowed to build up on said floor surface over the entire growing period of the poultry.

9. The method according to claim 1 wherein said drying of the layer of manure is carried out such that the moisture level of said layer of manure is maintained below about 40 percent by weight, and said poultry is kept in said cage unit continuously until reaching marketable size, the droppings being allowed to build up on said floor surface over the entire growing period of the poultry and wherein a plurality of said floors are provided in vertically spaced relationship with the poultry being reared on each of said floors, said poultry comprising broiler chickens.

* * * * *